US012706909B2

(12) United States Patent
Jovic et al.

(10) Patent No.: US 12,706,909 B2
(45) Date of Patent: Aug. 11, 2026

(54) SYSTEM AND METHOD FOR ENTERPRISE CONFIGURATION SERVICES

(71) Applicant: Wells Fargo Bank, N.A., San Francisco, CA (US)

(72) Inventors: Dusan Jovic, Phoenix, AZ (US); Bhimesh Reddy Chinta, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 214 days.

(21) Appl. No.: 18/393,036

(22) Filed: Dec. 21, 2023

(65) Prior Publication Data

US 2025/0211590 A1 Jun. 26, 2025

(51) Int. Cl.
*H04L 9/40* (2022.01)

(52) U.S. Cl.
CPC ................................ *H04L 63/0876* (2013.01)

(58) Field of Classification Search
CPC .................................................. H04L 63/0876
USPC ......................................................... 709/220
See application file for complete search history.

(56) References Cited

U.S. PATENT DOCUMENTS 8,255,357 B1 8/2012 Heimbach et al.
8,489,872 B1 * 7/2013 Kapoor ................. G06F 16/258 718/1
10,255,303 B1 4/2019 Britton et al.
2004/0019662 A1 1/2004 Viswanath et al.
2005/0228874 A1 * 10/2005 Edgett ................... H04L 63/104 709/220
2005/0234931 A1 10/2005 Mp et al.

(Continued)

FOREIGN PATENT DOCUMENTS

EP 2 741 472 A1 * 4/2013 ............. H04L 29/08

OTHER PUBLICATIONS

Guo et al., "A Framework for Native Multi-Tenancy Application Development and Management," The 9th IEEE International Conference on E-Commerce Technology and The 4th IEEE International Conference on Enterprise Computing, E-Commerce and E-Services (CEC-EEE 2007), pp. 551-558 (Year: 2007).*

(Continued)

*Primary Examiner* — Taylor A Elfervig
(74) *Attorney, Agent, or Firm* — SCHWEGMAN LUNDBERG WOESSNER, P.A.

(57) ABSTRACT

Aspects of the present disclosure include systems and methods for building utilization. In one example, a method includes receiving, via an enterprise configuration service, a request from a client device for configuration data, wherein the request identifies the client device, and authenticating, via the enterprise configuration service, the client device against an authentication system to verify an identity of the client device based on the request. The method also includes retrieving, via the enterprise configuration service, the configuration data from a plurality of configuration data sources by making separate requests to each of the plurality of configuration data sources based on the request from the client device, and aggregating, via the enterprise configuration service, the configuration data from the plurality of configuration data sources into a single aggregated response. The method further includes transmitting the configuration data to the client device in the single aggregated response.

20 Claims, 8 Drawing Sheets

(56) References Cited

U.S. PATENT DOCUMENTS

| | | | | |
|---|---|---|---|---|
| 2007/0240165 | A1* | 10/2007 | Carey | H04L 41/0233 719/310 |
| 2007/0277110 | A1* | 11/2007 | Rogers | G06Q 10/10 715/736 |
| 2009/0037427 | A1* | 2/2009 | Hazlewood | G06F 16/278 |
| 2012/0210390 | A1 | 8/2012 | Janedittakarn et al. | |
| 2012/0297361 | A1 | 11/2012 | Dotan et al. | |
| 2014/0082059 | A1 | 3/2014 | Das et al. | |
| 2015/0205581 | A1 | 7/2015 | Narayanapillai | |
| 2016/0004731 | A1 | 1/2016 | Sivasubramanian et al. | |
| 2020/0204463 | A1 | 6/2020 | Guan et al. | |
| 2021/0044976 | A1* | 2/2021 | Avetisov | H04W 12/08 |
| 2022/0334889 | A1 | 10/2022 | Macleod | |
| 2023/0041959 | A1* | 2/2023 | Guccione | H04L 9/0822 |
| 2023/0267010 | A1* | 8/2023 | Wellum | G06F 9/5077 718/104 |
| 2024/0362043 | A1* | 10/2024 | Sanderson | G06F 8/38 |
| 2025/0068592 | A1* | 2/2025 | Chang | G06F 16/168 |

OTHER PUBLICATIONS

Al-Shardan, M. M. and Ziani, D. (2015). Configuration as a service in multi-tenant enterprise resource planning system. Lecture Notes on Software Engineering, 3(2):95-100. (Year: 2015).*

Ziani, Djamal, "Configuration in ERP SaaS Multi-Tenancy", 2015, Arxiv, ,International Journal of Computer Science, Engineering and Information Technology (IJCSEIT), Apr. 2014, vol. 4, No. 2, p. 1-17 (Year: 2014).*

M. Pathirage, S. Perera, I. Kumara and S. Weerawarana, "A Multi-tenant Architecture for Business Process Executions," 2011 IEEE International Conference on Web Services, Washington, DC, USA, 2011, pp. 121-128 (Year: 2011).*

Lee, Wonjae, "A Multi-tenant Web Application Framework for SaaS", 2012 IEEE Fifth International Conference on Cloud Computing, (2012), 2 pgs.

Madduri, H, "A configuration management database architecture in support of IBM Service Management", IBM Sytems Journal, vol. 46 No. 3, (2007), 17 pgs.

Mohan, Kannan, "Improving change management in software development: Integrating traceability and software configuration management", Decision Support Systems 45 922-936, (2008), 15 pgs.

* cited by examiner

SYSTEM AND METHOD FOR ENTERPRISE CONFIGURATION SERVICES

TECHNICAL FIELD

The present disclosure generally relates to configuration services, and more specifically, to enterprise configuration services.

BACKGROUND

Configuration services are used by organizations to manage and maintain the configuration settings and parameters of various software applications, hardware devices, and IT infrastructure components. For example, an organization's web server queries configuration services to determine ports to use for communication, memory caching values for loading web applications, and so on. The configuration services provide for configuration settings for all types of resources, such as servers, network devices, databases, and software applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Figure 1:
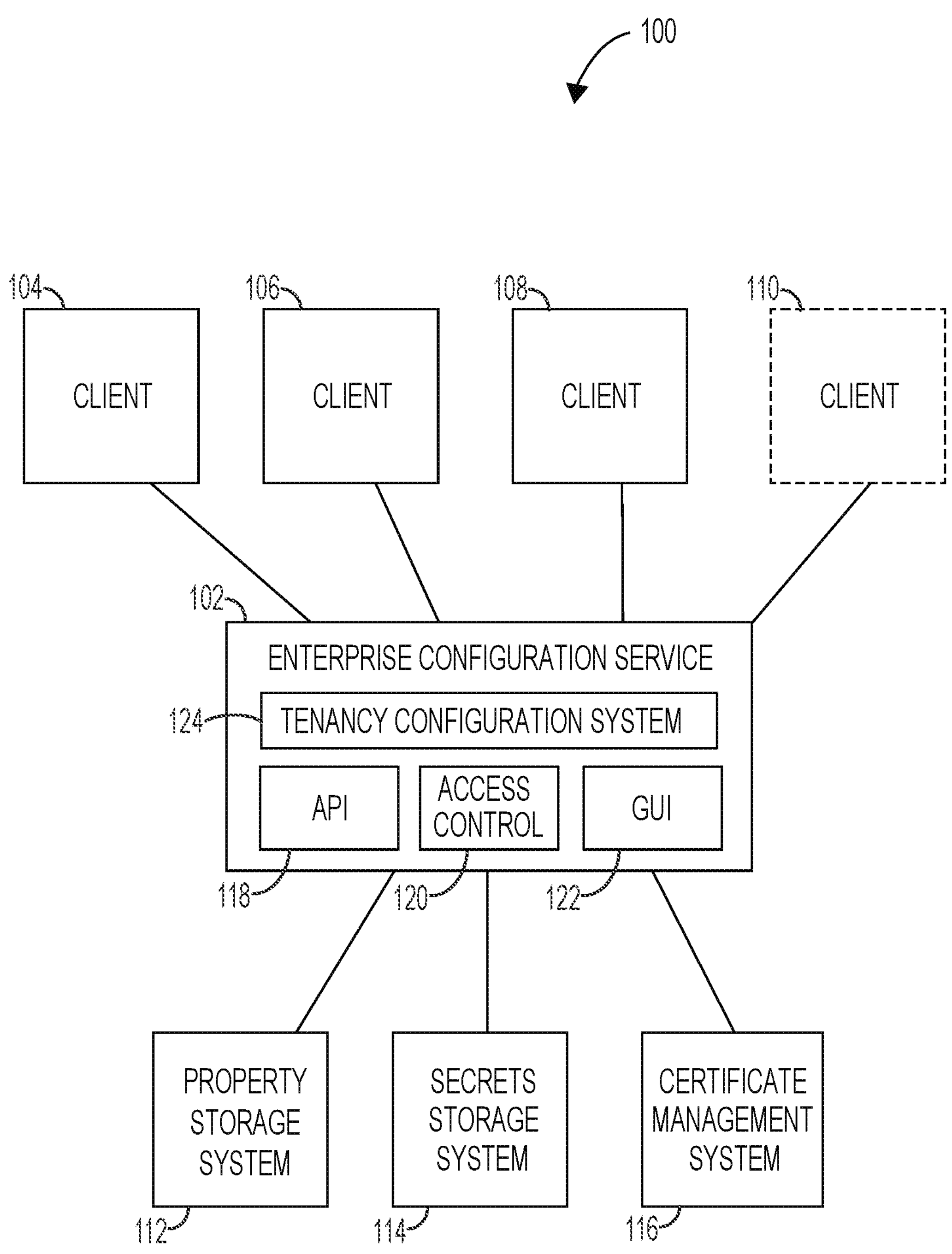
FIG. 1 is a block diagram illustrating a centralized configuration service-based system having an enterprise configuration service, according to some examples.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as eliminating having to rebuild/redeploy code just to change configuration settings, or having to bundle configuration information directly within application code. An enterprise configuration service abstracts the complexity of integrating with multiple heterogeneous configuration data sources like a property storage system (e.g., GitHub™), a secrets storage system (e.g., Vault™), a certificate management system (e.g., Venafi™), and the like. The enterprise configuration service thus provides for configuration-as-a-service, exposed via an application programming interface (API), accessible from the network by calling clients. This allows abstracting multiple sources behind a single API without locking clients into any specific tools. A runtime abstraction of federated, pluggable configuration sources, beginning with the platform storage system, secrets storage system, and certificate management system, is also provided, which integrates security with a directory service (e.g., Active Directory™) for access control between clients and configuration data based on admin roles and privileges. This allows more granular and enterprise-wide security policies. The API and a more efficient user interface (UI) enables clients to access specific subsets of configuration data, with further runtime flexibility for clients to choose which configuration data to retrieve.

The enterprise configuration service is deployed in an elastic tenancy model providing for a local configuration service. Accordingly, an enterprise-wide configuration service instance provides centralized configuration management using broad service account access to sources while certain teams can deploy localized configuration service instances with more limited service accounts. The API exposes a flexible request model that allows clients to retrieve their configuration on startup, periodically, or when notified. This allows greater flexibility in client deployment architecture and avoids rigidly bundling environment-specific settings within the application code or through the deployment pipeline. Additionally, clients may be statically or dynamically configured to retrieve environment-specific configurations, independent of their physical or logical network location, so long as that network is able to access the API frontend. Accordingly, the techniques described herein provide for a centralized configuration-as-a-service system with federated configuration sources, robust security, flexible access control, and elastic tenancy deployment options. The configuration service abstraction simplifies client application integration and configuration management.

Turning now to FIG. 1, the figure is a block diagram illustrating a centralized configuration service-based system 100 having an enterprise configuration service 102, according to some examples. In the depicted examples, clients 104, 106, 108, 110 (e.g., client devices) are shown as communicatively coupled to the enterprise configuration service 102. The clients 104, 106, 108, 110 are software clients, hardware devices, information technology (IT) infrastructure components, and logical clients, that are using the enterprise configuration service 102 to load configuration data, for example, during client startup, suitable for providing settings, flags, and other startup information that enables the clients 104, 106, 108, 110 to reconfigure themselves as participants in an organization's software systems, workflow systems, IT systems, and the like. The client 110, in one example, is a virtual or logical client that can participate in configuration activities. As can be understood, the clients 104, 106, 108, 110 are a non-limiting example and in an organization a large number of clients are found, which include interrelated clients numbering in the thousands. Changing clients, such as by adding, updating, or removing clients, cause configuration changes that can result in the redeployment or reinstall of other interrelated clients. The techniques described herein use the enterprise configuration service 102 as a centralized configuration-as-a-service as further described below, to more efficiently provide a single source of truth for configuration data that improves operational efficiency, and enhances the overall reliability of software, workflow, and IT systems.

The enterprise configuration service 102 acts as an intermediary between the clients 104, 106, 108, 110 and configuration data sources, such as the property storage system 112, the secrets storage system 114, and the certificate management system 116. The property storage system 112, which in some examples is a Github™ repository, provides for the storage of cache settings, client time-to-live settings, routing settings, and the like. The secrets storage system 114, which in some examples is a Hashicorp Vault™, provides encryption and access controls to securely store sensitive data like credentials, passwords, application programming interface (API) keys, certificates, and so on. This data is referred to as "secrets." The secrets storage system 114 enables creating, updating, retrieving and deleting secrets programmatically via its API. Fine-grained access policies can be applied for access to secrets. The secrets storage system 114 also generates dynamic short-lived secrets on-demand to be used by applications and infrastructure. This avoids static secrets. The certificate management system 116 provides lifecycle management, security and compliance capabilities specifically tailored for security certificates (e.g., SSL/TLS certificates, such as X.509 certificates) and encryption keys used by the clients 104, 106, 108, 110, and other infrastructure. The certificate and encryption keys are used for various purposes by the clients 104, 106, 108, 110 such as encrypting data, verifying the identity of websites and servers, and securing the transmission of sensitive information.

The enterprise configuration service 102 abstracts the complexity of integrating with multiple heterogeneous configuration data sources like the property storage system 112, the secrets storage system 114, the certificate management system 116, and so on. In the depicted example, the enterprise configuration service 102 provides a unified interface to all of the configuration data sources via a single API 118. The API 118 allows the clients 104, 106, 108, 110 to retrieve configuration artifacts, including configuration files, property files, secrets, and/or certificates (e.g., X.509 certificates) from the backend sources 112, 114, 116. The API 118 provides a runtime abstraction that hides the complexity of integrating with different configuration data sources from the client. For example, a single API call to the API 118 may result in multiple API calls to each of the backend sources 112, 114, 116 using their respective APIs.

In one example, a single API call, such as a "retrieve_config_and_cert" API call, will then retrieve, via multiple API calls to the property storage system 112 and to the certificate management system 116, configuration data from the multiple data sources. For example, properties are retrieved from the property storage system 112 and a X.509 certificate is retrieved the certificate management system 116. The retrieved data is then aggregated and delivered to the client who issued the single API call, thus abstracting backend sources of configuration data. The API 118 includes calls supporting various languages like Java, JavaScript, C #, and so on. In some examples, the API 118 is a Representational State Transfer (REST) API suitable for stateless communication between the enterprise configuration service 102 and the clients 104, 106, 108, 110.

Indeed, the enterprise configuration service 102 enables for a federated single source of configuration data when the configuration data is distributed and stored across multiple backend data sources 112, 114, 116, but it is accessed and presented to the clients 104, 106, 108, 110 as if it were coming from a single, unified source (e.g., the enterprise configuration service 102). This approach allows organizations to aggregate configuration data from various disparate systems or databases, whether they are on-premises or in the cloud, and provide a seamless and consistent interface for querying and retrieving configuration data.

The enterprise configuration service 102 additionally includes an access control system 120 which integrates with an enterprise authentication system, such as Active Directory, to implement a robust security model. Only authorized personas (e.g., referred to as "administrators") are permitted to configure access between clients and configuration data sources. Administrators can create virtual or logical clients, such as the client 110, in the enterprise configuration service 102, and authorize them to access specific subsets of configuration data. The authorization is delegated based on the administrator's own access privileges on the backend sources 112, 114, 116. The use of the access control system 120 allows for more granular and enterprise-wide security policies.

The enterprise configuration service 102 additionally includes a graphical user interface (GUI) 122. The GUI 122 is used to register and manage clients that can access the enterprise configuration service 102. Administrators use GUI 122 and/or the API 118 to control which clients 104, 106, 108, 110 may access which configuration data within the different configuration backends 112, 114, 116. The GUI 122 allows administrators to fully manage clients, configure fine-grained access policies, sync configuration data from sources, and monitor access activities related to the service. That is, the GUI 122 acts as the administrative interface to control the configuration service.

In one example, the GUI 122 provides for various settings, flags, and so on, via dynamic API calls. That is, the administrator can create a logical resource and expose it as a uniform resource locator (URL) path segment. That path segment is then bound to the various configuration settings, flags, certificates, secrets, and so on, and permits those resources to be returned via API call to one or more of the clients 104, 106, 108, 110. The configuration provided by the new API URL path segment allows flexible mapping to various backing resources, such as repository level, folder level, tag/branch level, and/or commit ID level. The clients 104, 106, 108, 110 can then choose which subsets of configuration data to retrieve from all the configuration data to which they have access. Additionally, profiles can be created to restrict the subset of data exposed for various configuration settings, flags, certificates, secrets, and so on. The profiles can be restricted, for example, for testing purposes. Once ready, the profiles are then imposed on certain of the clients 104, 106, 108, 110, which restricts access to data based on the profiles.

Also shown is a tenancy configuration system 124. The tenancy configuration system 124 provides for a team (e.g., a department in the organization) to have a local installation of the enterprise configuration service 102 or a subset of the enterprise configuration service 102. The local installation, e.g., single server only installation, is then supported by the team and used, for example, to provide for enhanced privacy and security. The local configuration service is accessible only to users who are members of the team. Additionally the local configuration service uses user accounts in the backend sources 112, 114, 116 that only access data for the users who are members of the team.

Figure 2:
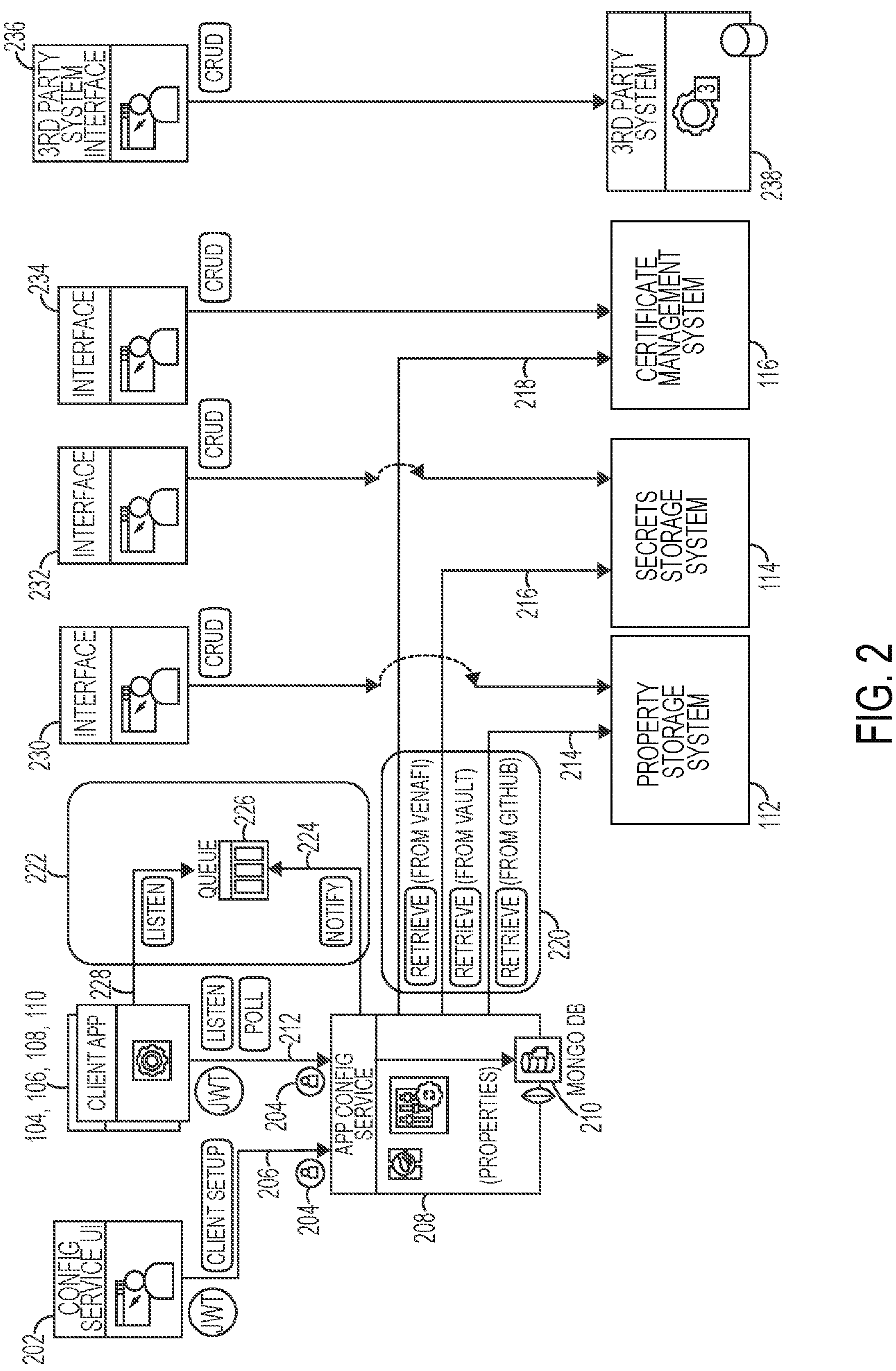
FIG. 2 is a data flow diagram illustrating further details of the enterprise configuration service of FIG. 1, according to some examples.

FIG. 2 is a data flow diagram depicting further details of the enterprise configuration service 102, according to some examples. In the depicted example, a configuration service user interface (UI) 202 is used to configure clients and to authorize access, via an authentication system 204, to certain configuration data, such as discreet properties, secrets, and/or certificates. Once authenticated by the authentication system 204, a client setup request 206 is transmitted to an application configuration service 208, which processes the client setup request 206. In some examples, the application configuration service 208 is the same or equivalent to the enterprise configuration service 102 described herein.

In certain examples, the client setup request 206 includes a request for configuration data to be retrieved from more than one of the backend sources 112, 114, 116. Accordingly, the application configuration service 208 processes the client setup request 206 to include multiple queries to the appropriate backend sources 112, 114, 116. A data store 210, such as MongoDB, is used to store, for example, the multiple queries to be provided when a client 104, 106, 108, 110 requests the configuration data.

Accordingly, the clients 104, 106, 108, 110 can submit a configuration data request 212, which is then processed by the application configuration service 208. More specifically, the configuration data request 212 includes a client identification (ID) that identifies a client of clients 104, 106, 108, 110 that is requesting the configuration data. The authentication system 204 will authenticate that the client requesting the configuration data is authorized to receive the configuration data by using the client ID and an authenticator, such as an API key, a certificate, and/or a password/login combination. Once authenticated, the application configuration service 208 will then retrieve the configuration data from the multiple configuration data sources by making separate configuration data requests 214, 216, 218 to each of the backend sources 112, 114, 116 based on the single configuration data request 212 from the client.

The configuration data returned by the backend sources 112, 114, 116 is then aggregated into a single aggregated response, and provided to the requesting client 104, 106, 108, 110. In the depicted embodiment, a cloud configuration service 220 is operatively coupled to the application configuration service 208 and used to interface with the backend sources 112, 114, 116. In one example, the cloud configuration service 220 is Spring Cloud Config. The cloud configuration service 220 provides for enhanced scalability and cross platform support.

Also shown is an event notifier system 222. In use, as changes in configuration occur, for example, when a new configuration for one or more of the clients 104, 106, 108, 110 is now to be used, the event notifier system 222 resynchs the clients 104, 106, 108, 110 through notifications 224. In the depicted embodiment, notifications 224 are placed in a queue 226, and a listener 228 will then retrieve the notifications 224 in a first-in-first-out order and resynch the client. During resynching, update or new configuration data is retrieved by the notified client and the notified client will then reconfigure itself (or be reconfigured) based on the new configuration data. In one example, the notifier system 222 is Spring Cloud Bus.

Also shown are backend interfaces 230, 232, 234, 236. Backend interfaces 230, 232, 234 directly interact with the backend sources 112, 114, 116. The backend interface 236 is a third-party system interface that interacts with a backend source 238. Indeed, new backend sources, such as the backend source 238, can be easily added based on the techniques described herein. For example, the new backend source 238 can be operatively coupled to the cloud configuration service 220 and the configuration service UI 202 can then be used to create configuration requests and so on, that target the new backend source 238.

The backend interfaces 230, 232, 234, 236 are native interfaces providing a direct interaction with the backend sources 112, 114, 116, 238, respectively. That is, a create, read, update, delete (CRUD) functionality is provided via the backend interfaces 230, 232, 234, 236, that enables the creation of configuration data, the reading of configuration data, the updating of configuration data, and the deletion of configuration data in respective backend sources 112, 114, 116, 238. Change management and versioning of configuration in well-governed path and folder structures is also provided by the backend interfaces 230, 232, 234, 236.

Figure 3:
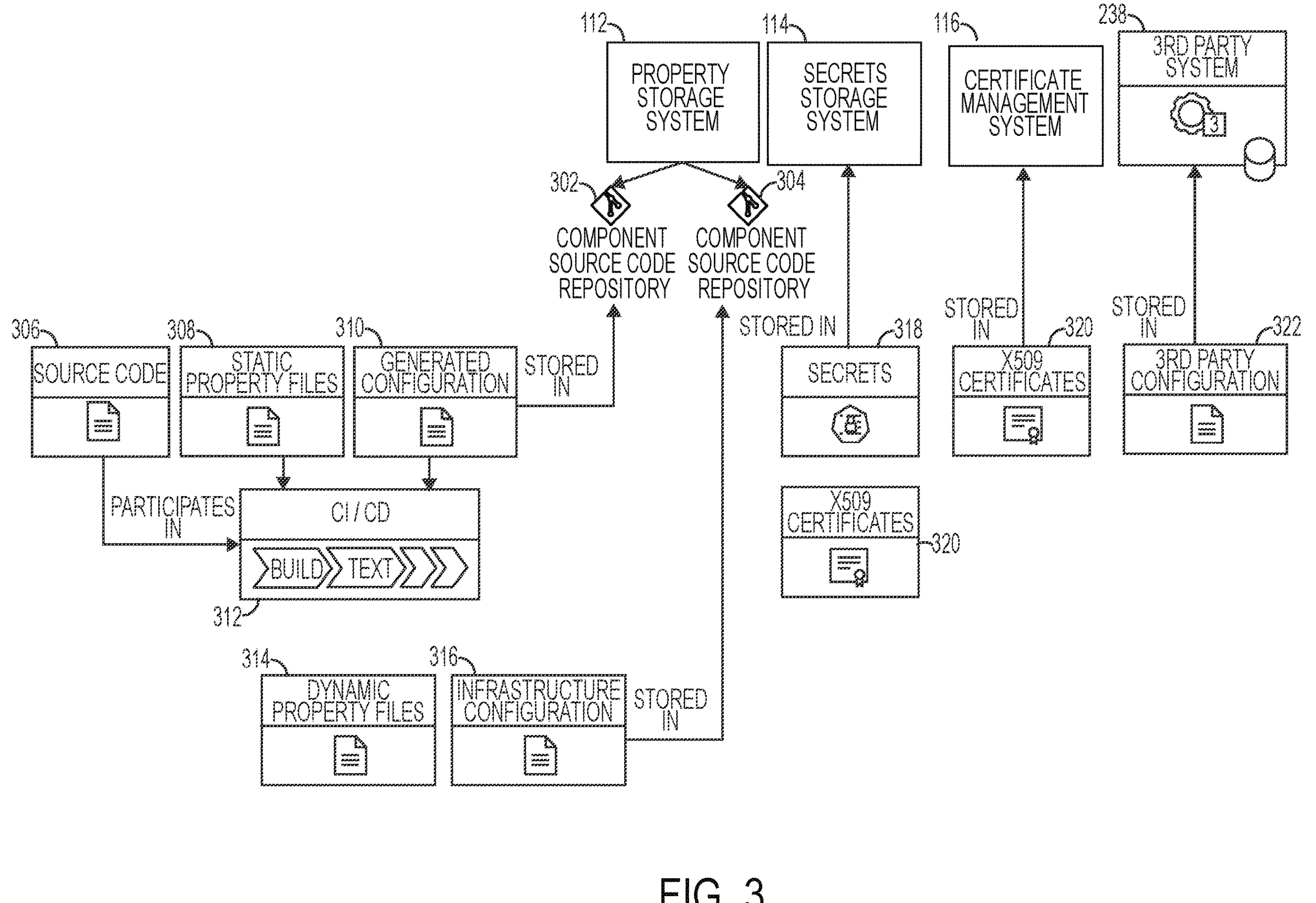
FIG. 3 is a data storage diagram illustrating configuration data storage details, according to some examples.

FIG. 3 is a data storage diagram depicting further configuration data storage details, according to some examples. In the depicted example, the backend sources 112, 114, 116, 238 are shown. The backend source 112 is used to store both computer source code, code-related configuration data, and other configuration data. Accordingly, a component source code repository 302 is used for source code and code-related configuration data, while a component configuration repository 304 is used for other configuration data. More specifically, the component source code repository 302 stores source code 306, static property files 308, and generated configuration data 310. Source code 306 includes computer instructions that can be compiled and linked, for example, into an executable program. Static property files 308 include non-secret static property data that does not change in real time and that does not differ per environment. For example, a "client.retry-count: 3." Generated configuration data 310 is created by code or built and is thus more closely coupled to a code artifact version. For example, an OpenAPI specification (OAS 3.0) spec file. The source code 306, static property files 308, and generated configuration data 310 then participate in a continuous integration/continuous deployment (CI/CD) pipeline 312 used to improve software delivery, for example, through automation. For example, the CI/CD pipeline 312 automatically releases build/test/merge code to the component source code repository 302 and/or the component configuration repository 304, and automatically deploys build/test/merge code to production systems.

The component configuration repository 304 stores dynamic property files 314 and infrastructure configuration data 316. The dynamic property files 314 are non-secrets that either may change in real time or differ per environment. For example, a "cache.replicas: 3." The infrastructure configuration data 316 tends to be configuration data that is completely separate from code. For example, helm charts that help manage Kubernetes applications, Apigee API proxy configuration that helps manage APIs, and Harness configuration that helps automate the CI/CD pipeline 312.

The secrets storage system 114 is used to store secrets 318. In some examples, the secrets storage system 114 also stores certain certificates 320, such as credentials, passwords, application programming interface (API) keys, certificates. Secrets include sensitive data like passwords, application programming interface (API) keys, cryptographic keys, and so on. The X.509 certificate binds an identity to a public key using a digital signature. The certificate contains an identity (a hostname, or an organization, or an individual) and a public key (RSA, DSA, ECDSA, ed25519, etc.), and is either signed by a certificate authority or is self-signed. The X. 509 certificate can be used for secure communications, such as via TLS/SLL, HTTPS, and the like. The certificate management system 116 also stores and manages certificates, including X.509 certificates. In examples where the X.509 certificate is also stored by the secrets storage system 114, The certificate management system 116 integrates with the secrets storage system 114 to control security policies and to perform issuance, while the secrets storage system 114 facilitates the retrieval of the X.509 certificate. Backend source 238 stores 3rd party configuration 322. The 3rd party configuration 322 that is stored varies based on the backend source 238 that has been added. For example, if the backend source 238 is an application performance monitor such as Elastic application performance monitoring (APM), then the third party configuration 322 includes configuration data to enable Elastic APM to monitor selected software services and collect performance information for analysis.

Figure 4:
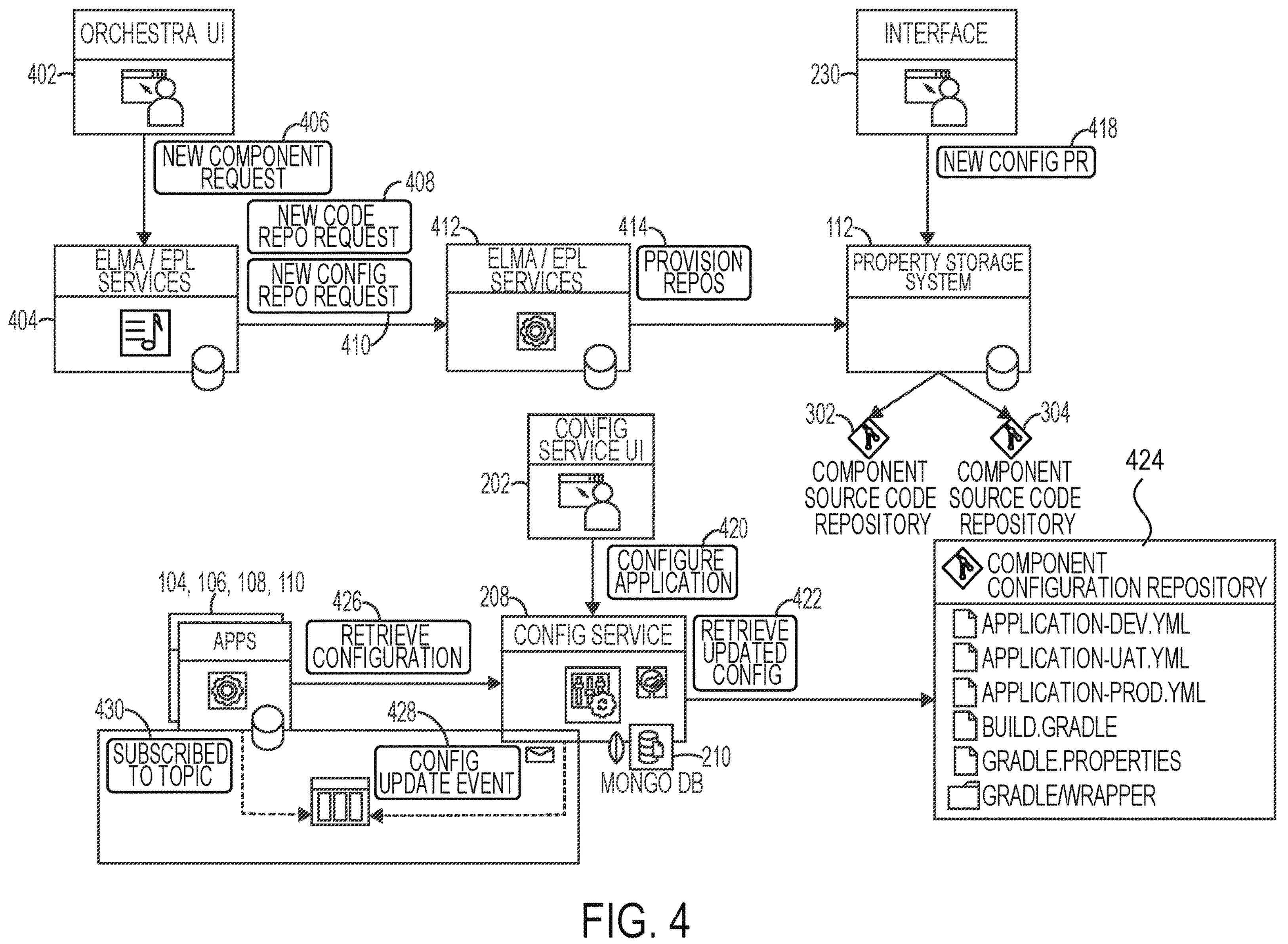
FIG. 4 is a data flow diagram depicting the creation of a new workflow, according to some examples.

FIG. 4 is a data flow diagram depicting the creation of a new workflow, according to some examples. Workflows, as referred to herein, include a collection of independent microservices that jointly work towards providing or supporting one or more processes of an organization. For example, a human resources (HR) new employee intake process would use a microservices framework having a first microservice used to enter new employee information into an employee database, a second microservice used to provision the employee in an accounting system, a third microservice used to send an IT request for certain IT resources to be assigned to the new employee, and so on.

In the depicted embodiment, a microservices orchestration UI 402 is shown, operatively coupled to a microservices orchestration manager 404. The microservices orchestration UI 402 is used to create or update new microservice code projects. For example, the microservices orchestration UI 402 is used to create a new microservice template in the microservices orchestration manager 404 via a new component request 406. The microservices orchestration manager 404 provides integration with the enterprise build system for the microservice, for example, by enabling a new code repository to be created, allowing that code repository to participate in continuous code builds, and so on.

The microservices orchestration manager 404 will then provision code and configuration repositories by sending a new code repository request 408 and/or a new configuration repository request 410 to a provisioning system 412 which will then issue one or more provision commands 414 to provision resource paths under one or more of the backend sources 112, 114, 116, 238, such as the depicted backend source 112. The user can additionally update certain backend source 112 information, such as application configuration data, by sending a new application configuration request 418 via the UI 230.

The configuration service UI 202 can then be used to update the application configuration service 208, for example, by issuing a configure application request 420. The application configuration service 208 in turn will retrieve an updated configuration 422 from a component configuration repository 424. In turn, one or more of the clients 104, 106, 108, 110 will retrieve the updated configuration 422 by issuing a retrieve configuration request 426. The one or more clients 104, 106, 108, 110 will now have their configurations updated or otherwise resynched.

In the depicted example, the one or more clients 104, 106, 108, 110 can be appraised of a new configuration so that they can resynch, via push or pull techniques. For example, the application configuration service 208 will publish a configuration update event 428 when a new configuration is ready for resynching. In turn, the one or more clients 104, 106, 108, 110 will subscribe, via a subscribe to topic request 430, to listen to (e.g., via pull) or to receive (e.g., via push) the configuration update event 428. Once appraised of the configuration update event 428, the one or more clients 104, 106, 108, 110 will then retrieve an updated configuration, such as via the retrieve configuration request 426, and apply the updated configuration. In this manner, the one or more clients 104, 106, 108, 110 are reconfigured as new updates are provided.

Figure 5:
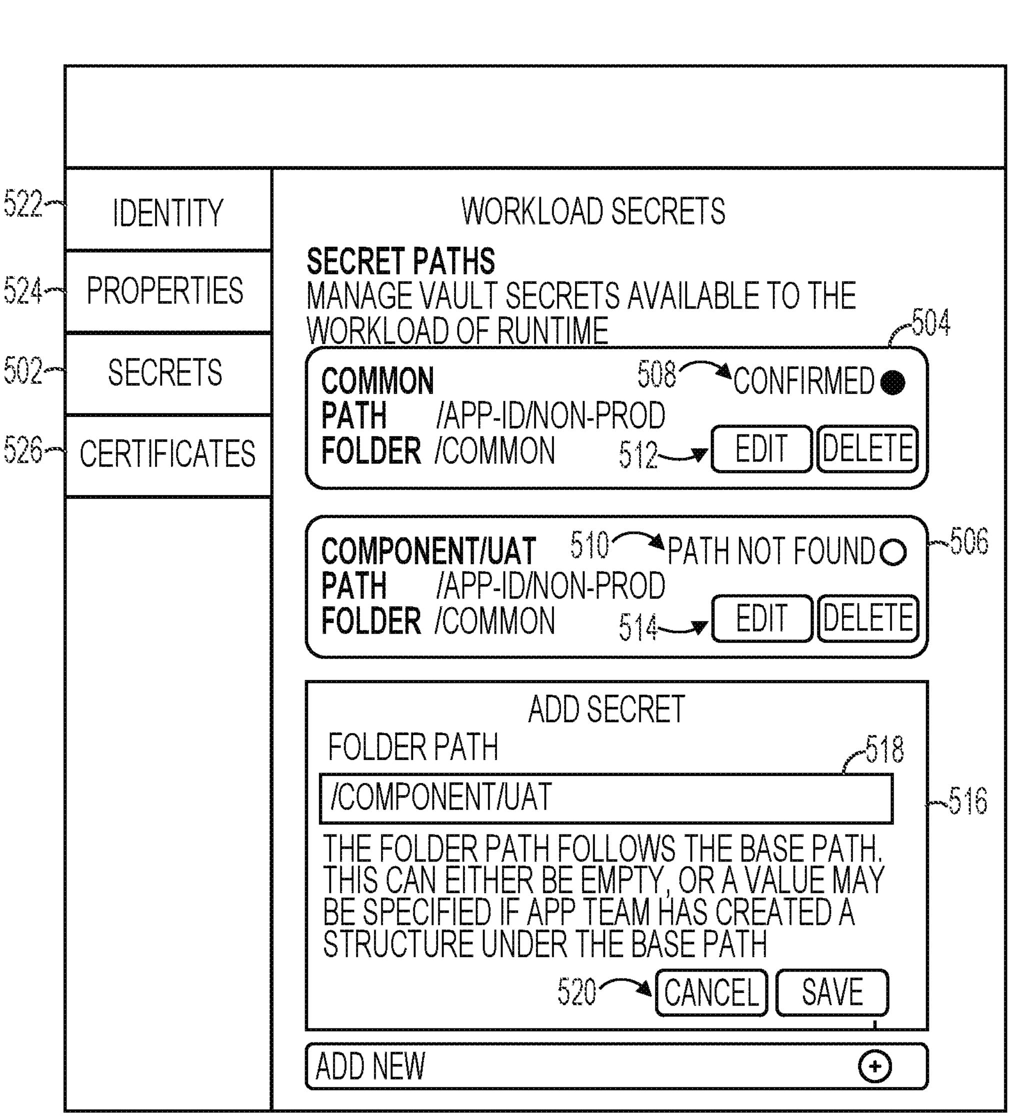
FIG. 5 is a screenshot illustrating a configuration user interface (UI) suitable for configuration of the enterprise configuration service of FIG. 1, according to some examples.

FIG. 5 is a screenshot illustrating a configuration user interface (UI) 500 suitable for configuration of the enterprise configuration service 102, according to some examples. In the depicted example, the UI 500 is a tabular UI showing a tab 502 representative of the configuration of certain secrets. As mentioned previously, secrets include sensitive data like passwords, application programming interface (API) keys, certificates, and so on, that are managed via the secrets storage system 114. The tab 502 displays secret paths to which a specific client is given access via the application configuration service 208. Additionally, tab 502 secret paths may be created, modified, or deleted for the purpose of modifying client access to those secrets.

In the depicted example, two secret paths 504 and 506 are illustrated. More specifically, secret path 504 is a common path while secret path 506 is a component/uat path. In use, visual indicators 508, 510 are used to provide an indication that the path is either confirmed or is not found. That is, once a user enters a path, the UI 500 will verify, via the secrets storage system 114, that the entered path is correct. For example, the UI 500 will attempt to access the entered path for verification purposes. Paths that are not found, such as path 506 in the depicted example, are still saved but then include an indicator, such as the indicator 506, that the path was not found or is otherwise inaccessible. Paths may not be found due to possible sync errors, such as access denied and network errors. Buttons 512, 514 are used to edit and/or to delete paths 504, 506, respectively.

A new secrets path is entered via a control 516, which then brings up a textbox 518 used to enter a desired path. Once the desired path is entered, buttons 520 are used to save (or cancel) the entered path. Saving the entered path results in the UI 500 verifying that the entered path does exist, and creates a new path (e.g., similar to paths 504, 506) with visual indicators (e.g., similar to indicators 508, 510) showing if the entered path is confirmed or if there are errors.

The UI 500 includes other tabs suitable for entering configuration information. In the depicted example, tabs 522, 524, and 526 are shown. Tab 522 is used to enter identity configuration information, such as user name, roles, groups, and other Active Directory information. The identity information can be delegated to code, for example, to a microservice via the tab 522. Accordingly, the code is now able to access configuration information, for example through the backend sources 112, 114, 116, 238, using the delegated role or authority.

The properties tab 524 is used to enter and/or assign property information, including custom properties. For example, uniform resource locators (urls), database information, location of certain files (e.g., log files, data files, shared memory files), and so on, can be stored as properties. Likewise, the certificates tab 526 is used to create and/or assign certain certificates, including X.509 certificates. The configuration information captured by the UI 500 can then be access by clients, such as the clients 104, 106, 108, 110. Additionally, the clients may further choose which subsets of data to retrieve from the entirety of configuration data accessible. Accordingly, a more flexible and efficient configuration of multiple clients is provided.

Figure 6:
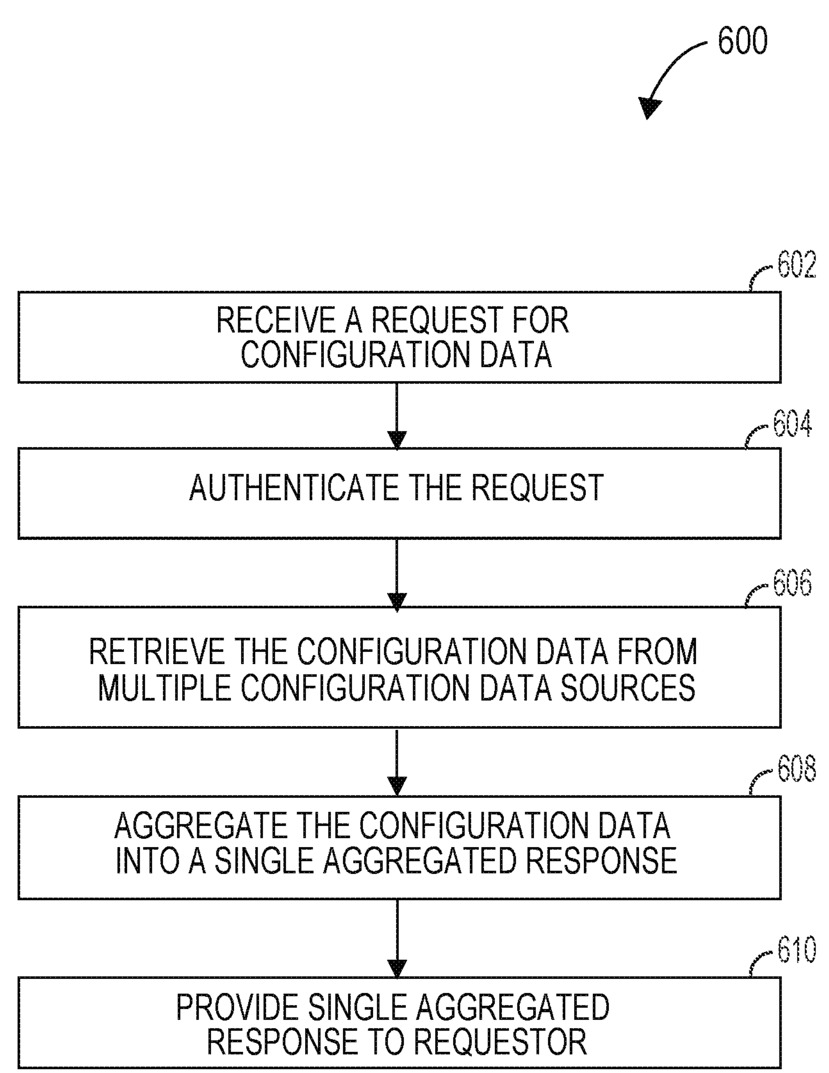
FIG. 6 is a flowchart of an example process suitable for retrieving certain configuration data, according to some examples.

FIG. 6 is a flowchart of an example process 600 suitable for retrieving certain configuration data, according to some examples. In the depicted example, the process 600 receives, at block 602, a request for configuration data. For example, a client, such as client 104, 106, 108, 110, requests configuration data via the enterprise configuration service 102. The requested configuration data, in some examples, is a subset of all configuration data that is accessible to the client. In some examples, the requested configuration data is stored in multiple of the backend sources 112, 114, 116, 238. In some examples, the request includes authentication information identifying and authenticating the client, such as a certificate, password, client ID, and so on.

The process 600 then, authenticates, via the enterprise configuration service 102, the client against an authentication system (e.g., authentication system 204) to verify the client identity based on the request at block 604. In some examples, the client authentication includes delegating to the client certain roles and/or group permissions to access a variety of configuration data. Accordingly, the client is now able to access configuration information, for example through the backend sources 112, 114, 116, 238, using the delegated role or authority.

Once the client is authenticated, the process 600, at block 606, retrieves the configuration data. For example, multiple of the backend sources 112, 114, 116, 238 can each be queried via the enterprise configuration service 102 by making separate requests to each of the backend sources 112, 114, 116, 238 based on the original client request. The process 600, at block 608, then aggregates the multiple responses from the backend sources 112, 114, 116, 238 into a single aggregated response that now has the configuration data requested by the client. The process 600 then provides, at block 610, the single aggregated response to the requesting client.

By aggregating responses from multiple backend sources 112, 114, 116, 238 via the enterprise configuration service 102, the techniques herein abstract multiple sources behind a single API provided by the enterprise configuration service 102 without locking clients into any specific tools. A runtime abstraction of federated, pluggable configuration sources, beginning with GitHub, Vault, and Venafi, is also provided, which integrates security with Active Directory for access control between clients and configuration data based on admin roles and privileges. This allows more granular and enterprise-wide security policies. Saving data in multiple backend sources is also provided via the enterprise configuration service 102, as further described below.

Figure 7:
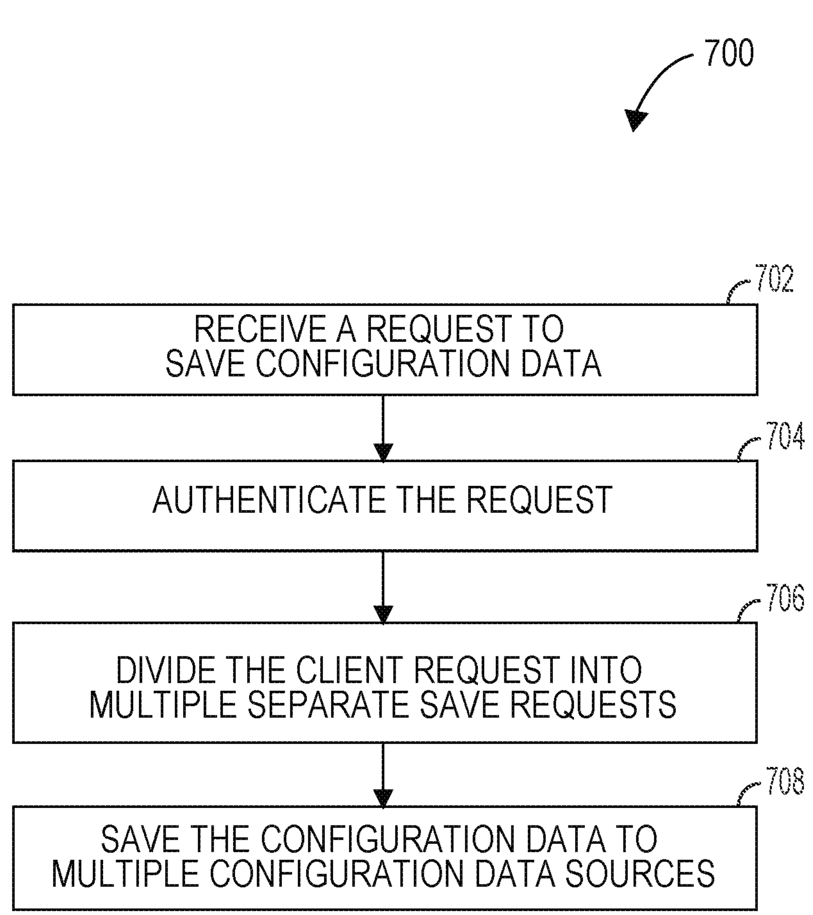
FIG. 7 is a flowchart of an example process suitable for saving certain configuration data, according to some examples.

FIG. 7 is a flowchart of an example process 700 suitable for saving certain configuration data, according to some examples. In the depicted example, the process 700 receives, at block 702, a request for saving configuration data. For example, a client, such as client 104, 106, 108, 110, requests saving certain configuration data via the enterprise configuration service 102. The configuration data to be saved, in some examples, is a subset of all configuration data that is accessible to the client. In some examples, the configuration data to be saved is stored in multiple of the backend sources 112, 114, 116, 238. In some examples, the save request includes authentication information identifying and authenticating the client, such as a certificate, password, client ID, and so on.

The process 700 then, authenticates, via the enterprise configuration service 102, the client against an authentication system (e.g., authentication system 204) to verify the client identity based on the request at block 704. In some examples, the client authentication includes delegating to the client certain roles and/or group permissions to access a variety of configuration data. Accordingly, the client is now able to save configuration information, for example through the backend sources 112, 114, 116, 238, using the delegated role or authority.

Once the client is authenticated, the process 700, at block 706, divides the client request configuration data to be saved via multiple save requests. For example, static properties, dynamic properties, generated configurations, and infrastructure configurations are stored in the property storage system 112. Credentials, passwords, and API keys are stored in the secrets storage system 114. Security certificates are stored in the certificate management system 116. That is, the configuration data to be stored, in some examples, includes multiple types of data, e.g., static properties, dynamic properties, generated configurations, infrastructure configurations, credentials, passwords, API keys, security certificates, and so on. Accordingly, the client request configuration data is divided into multiple save requests based on where storage of portions of the configuration data is going to occur. The process 700, at block 708, saves the configuration data by transmitting the multiple save requests to multiple of the backend sources 112, 114, 116, 238. By distributing configuration data from a single save request into multiple backend sources 112, 114, 116, 238 via the enterprise configuration service 102, the techniques herein abstract saving of data, in addition to retrieval of data.

Figure 8:
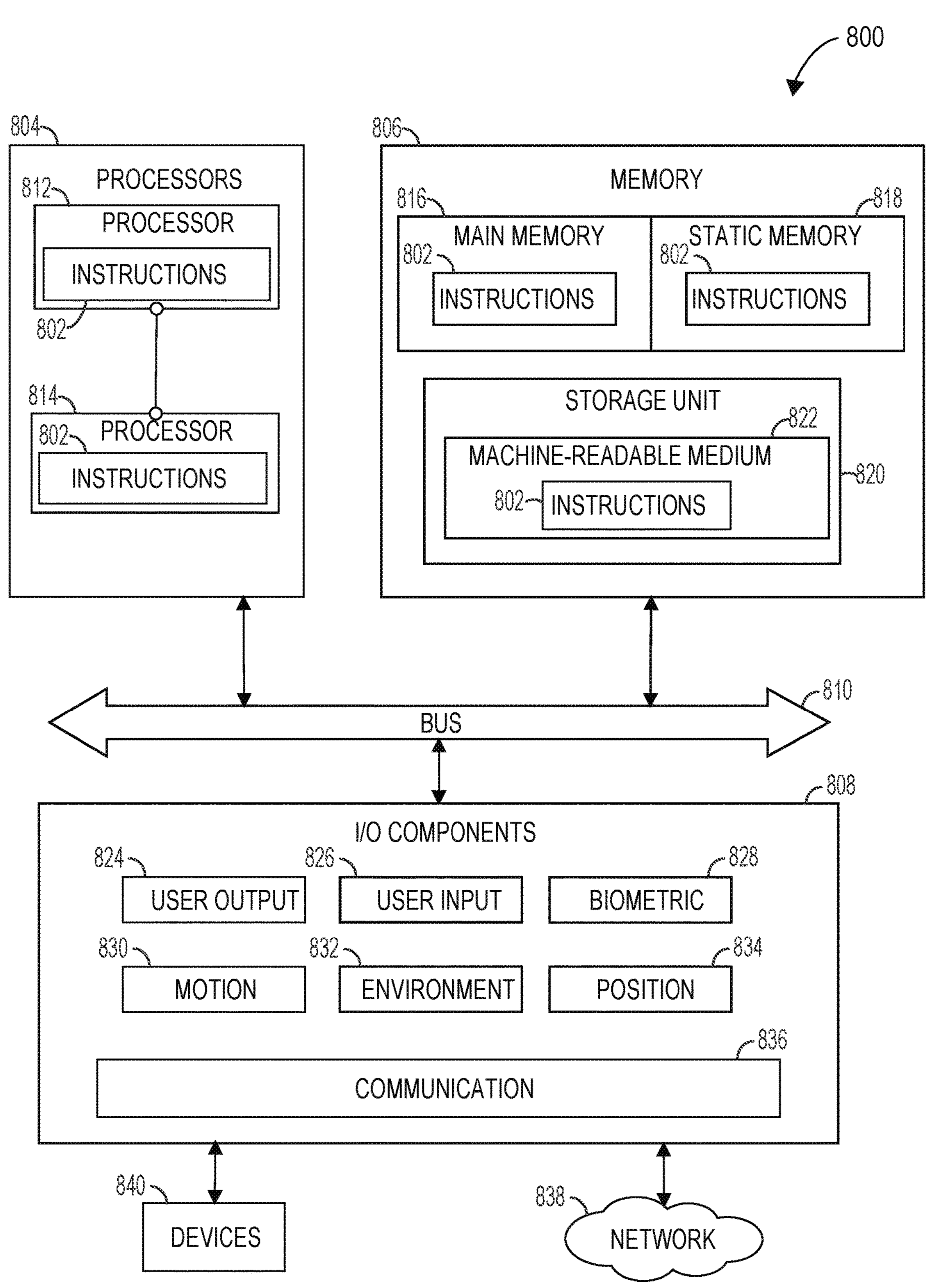
FIG. 8 is a block diagram depicting a machine suitable for executing instructions via one or more processors, in accordance with certain examples.

FIG. 8 is a diagrammatic representation of a machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the processes or methods described herein, such as the process 600. The instructions 802 transform the general, non-programmed machine 800 into a particular machine 800, e.g., the enterprise configuration service 102, programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 816, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a universal serial bus (USB) port), internet-of-things (IoT) devices, and the like.

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

The techniques described herein abstracts the complexity of integrating with multiple configuration data sources, like a software development and version control system (e.g., GitHub), a secrets storage system (e.g., Vault), a certificate management system (e.g., Venafi), and the like. A single application programming interface (API) is provided, accessible from the network by calling clients. This allows abstracting multiple sources behind a single API without locking clients into any specific tools. A runtime abstraction of federated, pluggable configuration sources, beginning with GitHub, Vault, and Venafi, is also provided, which integrates security with Active Directory for access control between clients and configuration data based on admin roles and privileges. This allows more granular and enterprise-wide security policies. The API and a more efficient user interface (UI) enables clients to access specific subsets of configuration data, with further runtime flexibility for clients to choose which configuration data to retrieve.

What is claimed is:

1. A system, comprising:

a memory storing executable instructions; and one or more processors configured to execute the instructions to:

receive, via a tenancy configuration system installation of an enterprise configuration service, a request from a client device for configuration data, wherein the request identifies the client device, wherein the tenancy configuration system comprises a local installation of the enterprise configuration system accessible to a local team only;

authenticate, via the enterprise configuration service, the client device with an authentication system to verify an identity of the client device based on the request;

retrieve, via the tenancy configuration system installation of the enterprise configuration service, the configuration data from a plurality of configuration data sources comprising at least a property storage system configured to store source code configuration data, a secrets storage system configured to store encrypted sensitive data, and a certificate management system configured to store security certificates, by making separate requests to each of the plurality of configuration data sources based on the request from the client device;

aggregate, via the tenancy configuration system installation of the enterprise configuration service, the configuration data from the plurality of configuration data sources into a single aggregated response; and transmit the configuration data to the client device in the single aggregated response.

2. The system of claim 1, wherein the one or more processors are further configured to: receive, via the enterprise configuration service, a second request from the client device to save a second configuration data, wherein the second request identifies the client device;

authenticate, via the enterprise configuration service, the client device against the authentication system to verify the identity of the client device based on the second request;

divide the second configuration data into a first configuration save request and a second configuration save request; and save the second configuration data into at least two of the plurality of configuration data sources by transmitting the first configuration save request to a first configuration data source of the plurality of configuration data sources and the second configuration save request to a second configuration data source of the plurality of configuration data sources.

3. The system of claim 1, wherein the one or more processors are further configured to execute the instructions to prepare the request, via the client device, by selecting a subset of all accessible configuration data as the configuration data.

4. The system of claim 1, wherein the one or more processors are further configured to execute the instructions to subscribe, via the client device, to an event notifier to receive a notification based on a change to the configuration data, and to transmit, via the client device, to the enterprise configuration system, a second request for the configuration data upon receipt of the notification.

5. The system of claim 1, comprising a software development and version control system configured to manage source code.

6. The system of claim 1, wherein the source code configuration data comprises a static property, a dynamic property, a generated configuration, an infrastructure configuration, or a combination thereof, and wherein the secrets storage system is configure to manage private configuration data, the private configuration data comprising a credential, a password, an application programming interface (API) key, a security certificate, or a combination thereof.

7. The system of claim 1, wherein the one or more processors are further configured to execute the instructions to apply, via the client device, the configuration data during startup to set up the client device.

8. The system of claim 1, wherein the one or more processors are further configured to install a local configuration service based on receiving a tenancy request, and wherein the local configuration service is included in the tenancy configuration system installation.

9. The system of claim 8, wherein the one or more processors are further configured to execute the instructions to:

receive, via the local configuration service, a second request from the client device for a second configuration data, wherein the second request identifies the client device;

authenticate, via the local configuration service, the client device against the authentication system to verify the identity of the client device based on the second request;

retrieve, via the local configuration service, the second configuration data from the plurality of configuration data sources by making separate second requests to each of the plurality of configuration data sources based on the second request from the client device;

aggregate, via the local configuration service, the second configuration data from the plurality of configuration data sources into a second single aggregated response; and transmit the second configuration data to the client device in the second single aggregated response, wherein the local configuration service is accessible only to users who are members of a team.

10. The system of claim 9, wherein the one or more processors are further configured to execute the instructions to permit access to the configuration data only to user accounts belonging to the members of the local team.

11. The system of claim 8, wherein the one or more processors are further configured to execute the instructions to install the local configuration service in a server accessible by users who are members of the local team.

12. The system of claim 1, wherein the one or more processors are further configured to execute the instructions to display a first native user interface (UI) and second native UI, wherein the first native UI is only operatively coupled to a first configuration data source of the plurality of configuration data sources and configured to issue first native commands to the first configuration data source, and wherein the second native UI is only operatively coupled to a second configuration data source of the plurality of configuration data sources and configured to issue second native commands to the second configuration data source.

13. The system of claim 12, wherein the one or more processors are further configured to execute the instructions to display a unified UI operatively coupled to the first configuration data source and to the second configuration data source, and wherein the unified UI is configured to issue the first native commands and the second native commands.

14. The system of claim 13, wherein the first and the second native commands comprise a create, a read, an update, and a delete command.

15. The system of claim 14, wherein the one or more processors are further configured to display, via the unified UI, a secrets interface configured to create a data path pointing to a private data stored by at least one of the plurality of configuration data sources.

16. The system of claim 15, wherein the one or more processors are further configured to validate, via the secrets interface, the data path and to visually indicate if the data path is valid.

17. A non-transitory machine-readable medium storing instructions that, when executed by a computer system, cause the computer system to perform operations comprising:

receiving, via a tenancy configuration system installation of an enterprise configuration service, a request from a client device for configuration data, wherein the request identifies the client device, wherein the tenancy configuration system comprises a local installation of the enterprise configuration system accessible to a local team only;

authenticating, via the enterprise configuration service, the client device against an authentication system to verify an identity of the client device based on the request;

retrieving, via the tenancy configuration system installation of the enterprise configuration service, the configuration data from a plurality of configuration data sources comprising at least a property storage system configured to store source code configuration data, a secrets storage system configured to store encrypted sensitive data, and a certificate management system configured to store security certificates, by making separate requests to each of the plurality of configuration data sources based on the request from the client device;

aggregating, via the tenancy configuration system installation of the enterprise configuration service, the configuration data from the plurality of configuration data sources into a single aggregated response; and transmitting the configuration data to the client device in the single aggregated response.

18. The non-transitory machine-readable medium of claim 17, wherein the operations further comprise:

receiving, via the enterprise configuration service, a second request from the client device to save a second configuration data, wherein the second request identifies the client device;

authenticating, via the enterprise configuration service, the client device against the authentication system to verify the identity of the client device based on the second request;

dividing the second configuration data into a first configuration save request and a second configuration save request; and saving the second configuration data into at least two of the plurality of configuration data sources by transmitting the first configuration save request to a first configuration data source of the plurality of configuration data sources and the second configuration save request to a second configuration data source of the plurality of configuration data sources.

19. A method, comprising:

receiving, via a tenancy configuration system installation of an enterprise configuration service, a request from a client device for configuration data, wherein the request identifies the client device, wherein the tenancy configuration system comprises a local installation of the enterprise configuration system accessible to a local team only;

authenticating, via the enterprise configuration service, the client device against an authentication system to verify an identity of the client device based on the request;

retrieving, via the tenancy configuration system installation of the enterprise configuration service, the configuration data from a plurality of configuration data sources by making separate requests to each of the plurality of configuration data sources comprising at least a property storage system configured to store source code configuration data, a secrets storage system configured to store encrypted sensitive data, and a certificate management system configured to store security certificates, based on the request from the client device;

aggregating, via the tenancy configuration system installation of the enterprise configuration service, the configuration data from the plurality of configuration data sources into a single aggregated response; and transmitting the configuration data to the client device in the single aggregated response.

20. The method of claim 19, further comprising:

receiving, via the enterprise configuration service, a second request from the client device to save a second configuration data, wherein the second request identifies the client device;

authenticating, via the enterprise configuration service, the client device against the authentication system to verify the identity of the client device based on the second request;

dividing the second configuration data into a first configuration save request and a second configuration save request; and saving the second configuration data into at least two of the plurality of configuration data sources by transmitting the first configuration save request to a first configuration data source of the plurality of configuration data sources and the second configuration save request to a second configuration data source of the plurality of configuration data sources.

* * * * *